Feb. 6, 1940.  W. B. PAINE ET AL  2,189,221
AUTOMOTIVE EQUIPMENT
Filed Feb. 21, 1938  3 Sheets-Sheet 2
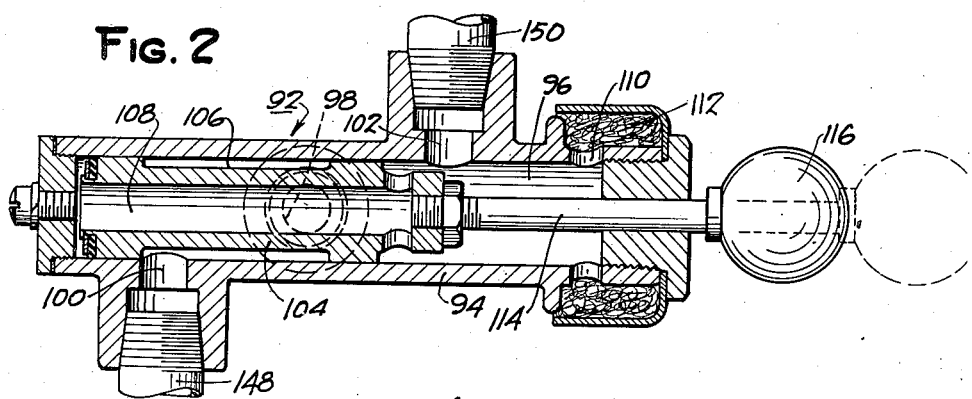
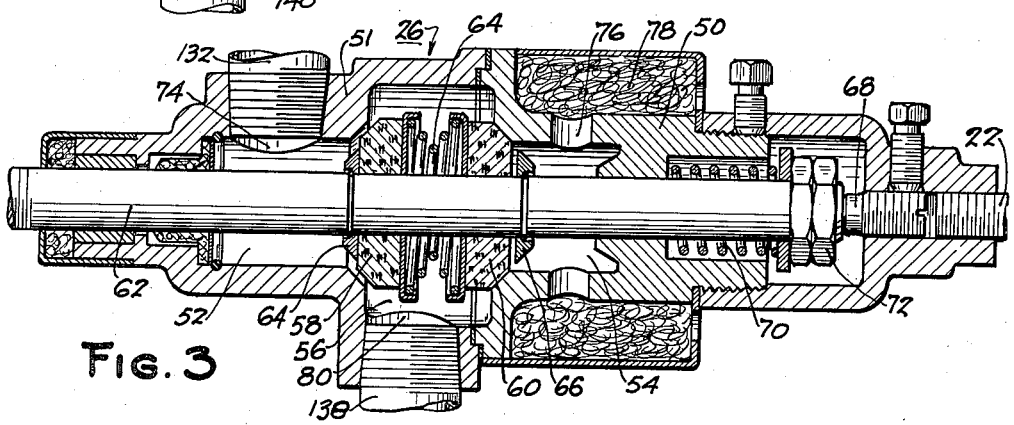
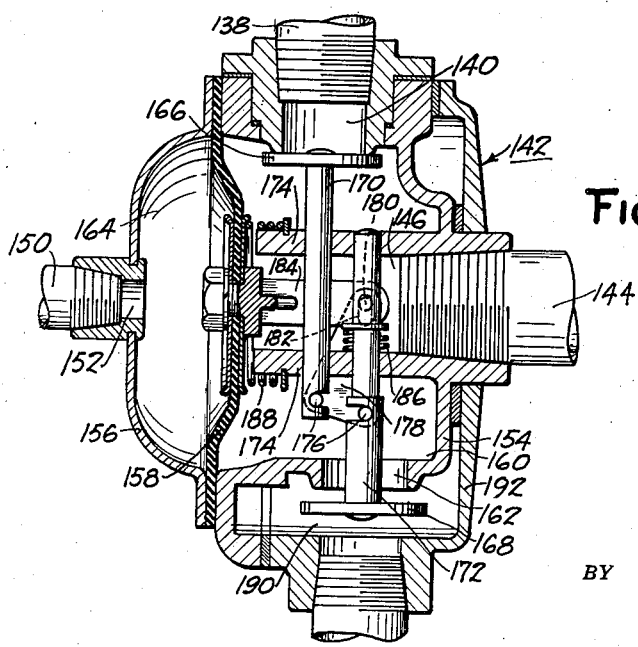
INVENTORS.
Willard B. Paine
Alexander A. Agueeff
BY Jerome R. Cox
ATTORNEY.

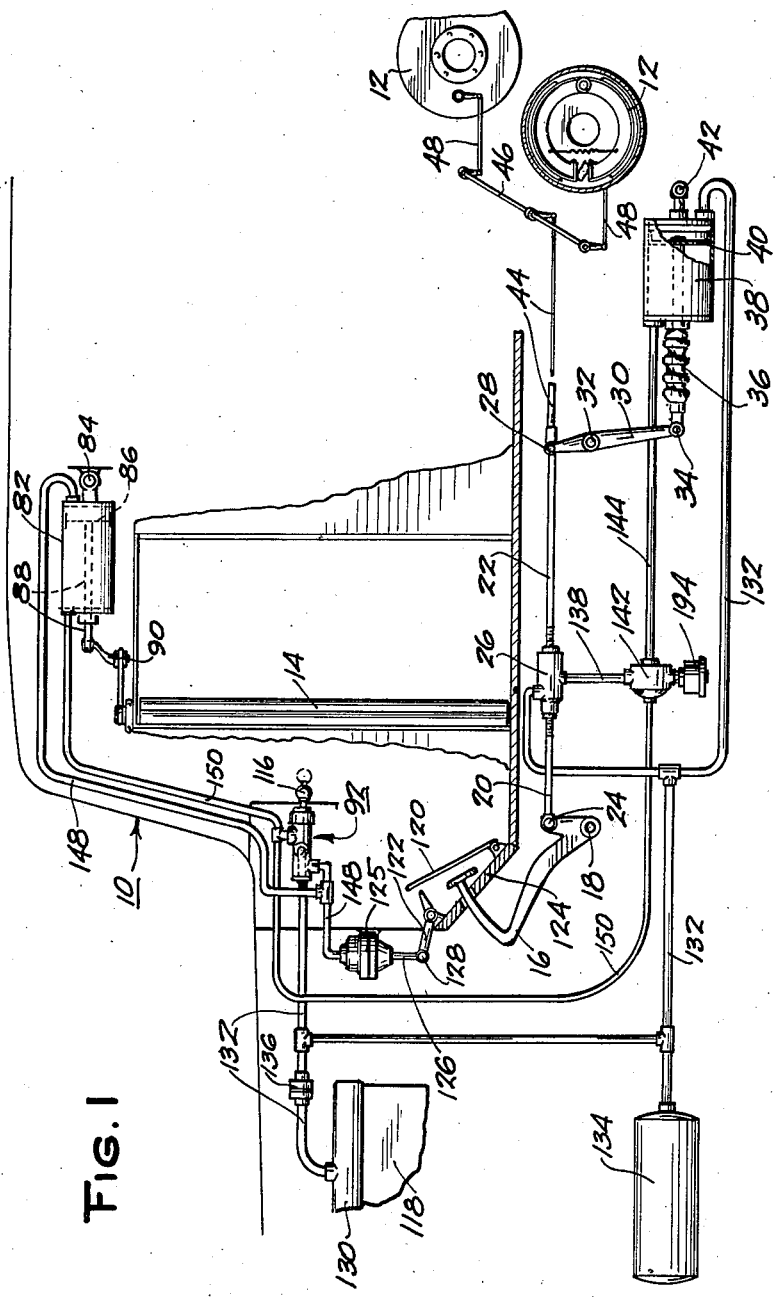

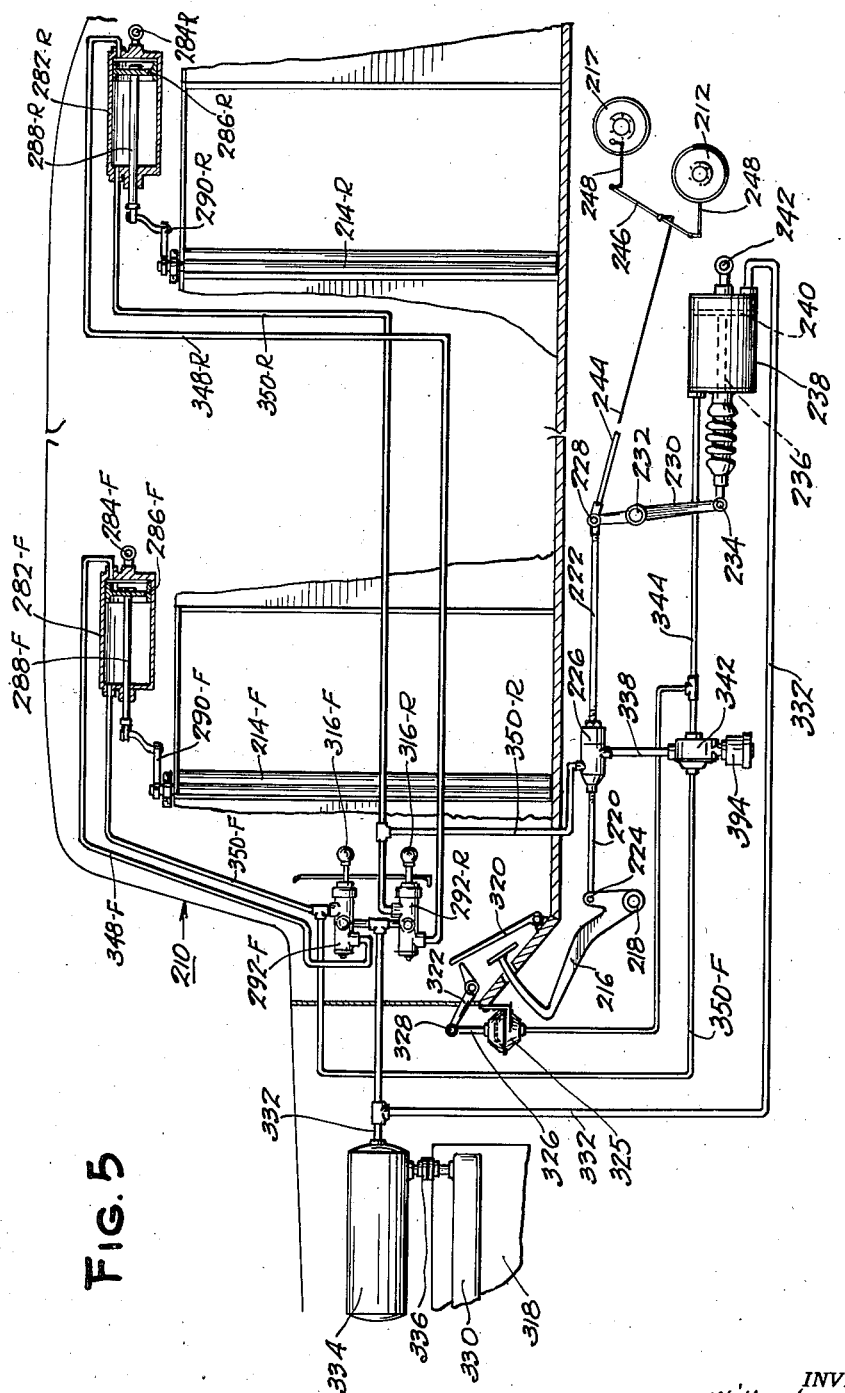

Patented Feb. 6, 1940

2,189,221

UNITED STATES PATENT OFFICE 2,189,221

AUTOMOTIVE EQUIPMENT

Willard B. Paine and Alexander A. Agueeff, South Bend, Ind., assignors to Bendix Products Corporation, South Bend, Ind., a corporation of Indiana Application February 21, 1938, Serial No. 191,651

6 Claims. (Cl. 303—6.1)

This invention relates to interlocking systems and more particularly to systems for interlocking the door opening mechanism and the brake applying mechanism of a vehicle in order to prevent movement of the vehicle while the door is open. Such a system is particularly applicable to motor buses and similar vehicles in which passengers are let out and admitted at frequent intervals.

The present invention is an improvement over the systems disclosed in the copending application, Serial Number 83,734, filed June 5, 1936, by Willard B. Paine, one of the applicants herein.

One of the objects of the invention is to make such vehicles more safe by preventing the opening of the doors except when the brakes are fully applied.

A further object of the invention is the provision of an interlock device so arranged that when the door is opened, the actuation of the door operating means also actuates means for applying the brakes.

A further object of the invention is the provision, in combination with the above features, of a stop for preventing the operation of the throttle control when the door is opened.

A feature of the invention is the arrangement of valves and conduits so that, while the power braking system is effective and the brakes may be applied at all times as though there were no interconnected door operating device, operation of the door opening device also automatically applies the brakes.

Further objects and features of the invention will be apparent after a reading of the subjoined specification and claims and after a consideration of the accompanying drawings, in which:

Figure 1 is a diagrammatic view of a brake and door-opening system arranged according to our invention;

Figure 2 is a longitudinal sectional view on an enlarged scale of the valve used for controlling the door opening and the simultaneous brake operation;

Figure 3 is a longitudinal sectional view on an enlarged scale of the valve used for controlling the normal operation of the brakes;

Figure 4 is a sectional view on an enlarged scale of the relay valve used in our novel system; and Figure 5 is a diagrammatic view of a modified system in which there are two doors having individual means for opening them, both of which means are separately interlocked with the brakes.

Referring in detail to the drawings, in which the same numerals have been used to indicate corresponding parts in the several views, there is shown in Figure 1 an automobile bus 10 provided with brakes 12 and a door 14. A brake pedal 16 is provided for the normal operation of the brakes 12 and is pivotally mounted as at 18 on the chassis of the bus.

A brake rod comprising two parts 20 and 22 is pivotally connected to the pedal at 24 and extends toward the rear of the bus. The two portions of the brake rod are connected together by, and serve to support and operate, a brake control valve 26 which is shown in detail in Figure 3 and which will be described more fully below. The rearward part 22 of the brake rod is pivotally connected at 28 to one end of a power lever 30.

The lever 30 is pivotally supported intermediate its ends on a pivot 32 secured to the bus chassis, and the other end of the lever is pivotally connected at 34 to the piston rod 36 and piston 38 of a power cylinder 40. The power cylinder is swingably supported at the end opposite the piston rod 36 by a pivot 42 secured to the bus chassis.

The pivot 28 on the power lever 30 also receives the forward end of another brake rod 44 which extends rearwardly and is connected to a cross-shaft 46 to rotate it and apply the brakes 12 through links 48.

The brake control valve 26 may take many well-known forms of which one is illustrated in Figure 3 comprising two body shell members 50 and 51 secured together to form three chambers, a vacuum chamber 52, an air chamber 54, and a controlled pressure chamber 56, the first two of which at times communicate with the third through the opening of a vacuum valve 58 and an air valve 60 respectively.

The two valves comprise resilient discs mounted on a plunger 62 slidable in longitudinal bores in the body shells, the two discs being mounted in opposed relation and having a compression spring 64 between them urging them onto their respective seats.

The plunger 62 is provided with a pair of abutments 64 and 66 each adapted to engage and lift one of the valves 58 and 60 from its seat when the plunger is moved in an appropriate direction, said abutments, however, being spaced sufficiently far apart to permit both valves to be seated in one of the positions of the plunger.

The plunger is normally held to the right in engagement with a stop 68 and with the vacuum valve lifted, as seen in Figure 3, by a spring 70 compressed between the body shell 51 and a pair of lock nuts 72 threaded on the plunger. The lock nuts 72 also serve, by engaging a portion of the body shell 51, to adjustably limit the leftward movement of the plunger.

Communication with the various chambers 52, 54 and 56 is respectively provided by means of a vacuum port 74, an air port 76 communicating with an air cleaner 78 and a controlled pressure port 80.

As shown in Figure 1 the brake control valve 26 has its plunger 62 connected to the forward brake rod portion 20, and its body 50—51 secured to the rearward brake rod portion 22. Figure 3 shows the normal brake released position of the brake control valve 26 wherein the vacuum valve 58 is open, admitting vacuum from the port 74 and chamber 52 to the controlled pressure chamber 56. When the pedal 16 is depressed to apply the brakes, the tension between the brake rod portions 20 and 22 causes the plunger 62 to move to the left (Figure 3) compressing the spring 70, first seating the vacuum valve 58, and then lifting the air valve 60 to admit air to the controlled pressure chamber 56.

A double acting power device comprising a cylinder 82 pivoted to the bus body at 84 and containing a piston 86 adapted to actuate a piston rod 88, is provided for opening and closing the door 14. The piston rod 88 is connected to suitable linkage 90 to open the door 14 when the piston is in the position shown and to close the door when the piston has been moved to its other extreme position at the left-hand end of the cylinder as seen in Figure 1.

The operation of the power device 82—90 is controlled by a door control valve 92 shown in detail in Figure 2. This valve comprises a body casting 94 having a longitudinal bore 96 intersected by three transverse ports, one of which is a vacuum port 98 positioned approximately centrally of the length of the bore 96, and the others of which are control ports 100 and 102 positioned substantially equidistantly on each side of the vacuum port 98.

Slidable in the bore 96 is a spool valve member 104 having a reduced diameter portion 106 wide enough to embrace the vacuum port 98 and the control port 100 when in the extreme inward position as shown in Figure 2 in full lines, and the vacuum port 98 and the other control port 102 when in the extreme outward position as indicated in dotted lines in Figure 2. At the same time, the enlarged diameter end portions of the valve member 104 are short enough to open the respective other control port to communication with the bore 96 in the various extreme positions.

The valve member is provided with a longitudinal passage 108 and the bore 96 communicates with the atmosphere through ports 110 and an air cleaner 112 whereby air is always admitted to the control port which is not connected to the vacuum port 98.

The valve 92 is controlled by a rod 114 connected to the plunger 104 at its inner end and extending out of one end of the body casting 94 to receive on its outer end a handle 116.

The automobile bus 10 is provided with the usual internal combustion engine 118 adapted to be controlled by an accelerator pedal or throttle control pedal 120. As a minor feature of our invention we provide an accelerator stop comprising a bellcrank lever 122 pivoted to the usual footboard 124 of the bus and arranged so that, in the position shown in Figure 1, one of its arms is in a position to prevent depression of the accelerator pedal 120 and consequently to prevent the generation of large amounts of power by the engine 118. The position of this arm of the bellcrank lever 122 is controlled by a diaphragm power cylinder 125 having a connecting rod 126 pivotally connected to the other arm of the bellcrank lever at 128. The power cylinder 125 is constructed and arranged to move the bellcrank so as to prevent acceleration of the engine by the foot accelerator when vacuum is applied thereto.

The internal combustion engine 118 has the usual intake manifold 130 which we prefer to use as a source of differential air pressure for operation of the various power controls described above. A conduit 132 extends therefrom and is connected through several branches to the vacuum ports 74 and 98 of the brake control valve 26 and the door control valve 92 respectively to the rearward end of the brake power cylinder 38 and to a reserve tank 134.

The conduit 132 has a check valve 136 connected thereinto adjacent the manifold 130 which prevents flow of air from the manifold and, in conjunction with the reserve tank, provides power for operation of the power controls when the engine is stopped.

The controlled pressure port 80 of the brake control valve 26 is connected by a conduit 138 to the vacuum port 140 (Figure 4) of a relay valve 142 shown in detail in Figure 4 and which will be described below. A conduit 144 extends from a controlled pressure port 146 of the relay 142 to the forward end of the brake power cylinder 38.

The control port 100 of the door control valve 92 is connected by a branching conduit 148 to the rearward end of the door power cylinder 82 and also to the accelerator stop power cylinder 125. The control port 102 is connected by a branching conduit 150 to the forward end of the door power cylinder 82 and to a controlling pressure port 152 of the relay 142.

Referring to Figure 4, the relay 142, although it may take many different well-known forms, may comprise a valve body 154 and a cover 156 having clamped between them a diaphragm 158. The body 154 and the diaphragm 158 form a controlled pressure chamber 160 having in its end the controlled pressure port 146 and on opposite sides the vacuum port 140 and an air port 162. The cover 156 and the diaphragm 158 form between them a controlling pressure chamber 164 with which the controlling pressure port 152 communicates.

The vacuum port 140 and the air port 162 are respectively closed by vacuum and air valves 166 and 168, which have stems 170 and 172 slidably mounted in opposed parallel relation in integral projecting supports 174 formed on the valve body 154.

Each of the valve stems 170 and 172 is notched to pivotally and slidably receive pins 176 carried by and defining one arm of a floating bellcrank lever 178, the other arm of which is pivotally and slidably connected by a pivot pin 180 and slot 182 to a yoke plunger 184 secured to the center of the diaphragm 158. A light coil spring 186 biases the air valve 168 toward closed position and a light coiled spring 188 biases the diaphragm to a normal position toward the left in which the air valve 168 is closed and the vacuum valve 166 is open.

The air port 162 of the relay valve 142 communicates with a chamber 190 formed by another cover member 192, which chamber communicates with an air cleaner 194 (Figure 1).

The figure, as already mentioned, show the various ports in the positions which they occupy when the door 14 of the bus 10 is open. It will be seen that vacuum passes from the conduit 132, through the valve 92, to the control port 100 to conduit 148 which in turn conducts it to the rearward end of the door power cylinder and to the accelerator stop power cylinder 125 to move the stop into preventing position.

At the same time air is admitted to the control port 102 of the door control valve 92 and passes therefrom through the conduit 150 to the forward end of the door power cylinder 82, in which, having vacuum at the rear and air at the front of the piston, the piston 86 moves toward the rear to occupy the position shown and open the door 14.

Air also passes through another branch of the conduit 150 to the controlling pressure chamber of the relay valve 142, causing the ports of said valve to move to the position shown, and thereby admitting air through the air port 162 to the forward end of brake power cylinder. Since the brake power cylinder has vacuum at its rearward end, the piston 40 is moved toward the rear, rotating the power lever 30 in a counter-clockwise direction to draw upon the brake rod 44, rotate the cross-shaft 46 and apply the brakes 12.

It will be noted that at the same time, the brake rod 20—22 and the brake control valve 26 are pushed forwardly depressing the pedal 16. Compression in the rod 20—22, however, merely urges the parts of the valve 26 more strongly toward normal position and has no other effect. The depression of the brake pedal has no desirable effect other than to indicate that the brakes are applied as they should be, and consequently this might be avoided by a suitable lost motion connection at some point along the rod 20—22.

Thus with the brakes applied and movement of the accelerator 120 prevented, it is impossible for the bus driver to move the vehicle. Assuming now that it is desired to close the door, the handle 116 of the door control valve 92 is pulled outwardly or toward the rear to the position indicated in dotted lines. In this position vacuum is transmitted through the control port 102 to the conduit 150 and therethrough to the forward end of the door operating power cylinder 82, while, at the same time, air is admitted to the conduit 148 from the control port 100 of the valve 92 and through said conduit to the rearward end of the door operating power cylinder 82. The differential pressures acting on opposite sides of the piston 86 moves the piston toward its forward extreme position, and the motion of the piston transmitted through the linkage 90 closes the door 14.

The vacuum in the other branch of the conduit 150 acts on the diaphragm 158 of the relay valve 142 to shift it toward the left (as seen in Figure 4) and thereby close the air valve 168 and open the vacuum valve 166. Since the brake control valve 26 is in its released position, vacuum exists in the conduit 138, and, upon the opening of the valve 166 this vacuum enters the controlled pressure chamber 160 and passes therethrough to the conduit 144 to the forward end of the brake power cylinder. The usual return springs thereupon act to move the piston 40 forwardly to release the brakes 12.

Also the air in the conduit 148 enters the diaphragm power cylinder 125 causing it to shift the accelerator stop mechanism out of engagement with the accelerator and thereby permitting full power to be generated by the engine 118 to move the bus.

Of course, upon the release of the brakes, the pedal 16 is drawn back to its normal position and if it is now desired to operate the brakes in the usual manner, the pedal 16 is depressed by the foot of the operator drawing the brake rod 20—22 forwardly to apply the brakes. The tension in the rod 20—22 causes the control valve 26 to shift and close the vacuum valve 58 and open the air valve 60 whereupon air is admitted to the conduit 138. Since the valve 166 of the relay 142 is open the air passes into the controlled pressure chamber 160 and therefrom, through the conduit 144 to the front end of the power cylinder 38 whereupon the cylinder also acts to apply the brakes as long as tension is maintained in the rod 20—22.

It will be noted that the air in the controlled pressure chamber 160 of the relay valve 142 merely adds additional force to hold the diaphragm 158 in its extreme left-hand position with the valve 166 open whereby an open passage is maintained through the valve from the conduit 138 to the conduit 144.

Release of the pedal closes the air valve 60 and opens the vacuum valve 58 of the brake control valve reestablishing vacuum in the conduit 138, the controlled pressure chamber 160 of the relay valve 142, the conduit 144 and the forward end of the power cylinder 38 to release the brakes.

Referring now to Figure 5 there is shown a modified system having two doors. The elements of this system which correspond to elements previously described have been designated by the same reference numerals increased by 200 and such elements will not be further described hereafter.

In the figure the two doors are illustrated as a front door and a rear door of an automobile bus 210 and the reference numerals on corresponding parts thereof are the same with the addition of F or R to indicate the front door or the rear door respectively. As separate door control valve is provided for operating each door individually and each door control valve is interlocked with the braking system to operate in the same way as the modification previously described.

This is accomplished by connecting the vacuum port 274 of the brake control valve 226 to the conduit 350R extending from the port 302R of the rear door control valve 292R instead of directly to the vacuum conduit 332.

The accelerator stop diaphragm power cylinder 325 has been inverted so that it moves the bellcrank lever 322 to preventing position when air is admitted to it and moves it out of preventing position when vacuum is admitted to it. The cylinder 325 is connected to a branch of the conduit 344 which has air admitted to it to apply the brakes and which consequently admits air to the said cylinder whenever the brakes are applied to lock the accelerator pedal 320.

Figure 5 shows both doors open and in this condition the brakes 212 are applied in the following manner. Air in line 350F shifts the valve mechanism of the relay valve 342 to admit air from the air cleaner 394 to the conduit 344. Now if the front door 214F is closed by drawing out the handle 316F of the valve 292F, vacuum is transmitted by the conduit 350F to shift the relay valve back to its normal position wherein a passage is open between the conduits 338 and 344. However, the air in the conduit 350R resulting from the fact that the rear door is open now passes through the normally open passage in the brake control valve 226 to the conduit 338 and through the now open passage in the relay valve 342 to the conduit 344 to hold the brake applied.

Now if the rear door should also be closed, vacuum is substituted for air in the conduit 350R as a result of the operation of the control valve 292R to door closed position, and this vacuum travels through the above enumerated passages and conduits to release the brakes.

With both doors closed the operation of the brakes by means of the pedal is exactly as described with reference to the preceding embodiment.

While two embodiments of our invention have been illustrated and described, we do not intend to be limited by those embodiments or otherwise than by the terms of the appended claims.

What we claim is:

1. For use with an automotive vehicle, a combined system including a source of vacuum, vacuum means for applying brakes including a cylinder normally connected at both ends to the vacuum source and a brake-operating member in said cylinder, vacuum means for opening a door, control means for each of said vacuum means, said brake control means including a relay valve for connecting one end of said cylinder to the atmosphere irrespective of the control for the brakes when said door opening control means is operated to door opening position.

2. For use with an automotive vehicle, a combined system including fluid pressure means for applying brakes, fluid pressure means for opening a door, control means for each of said fluid pressure means, said brake control means including a relay valve for actuating said brake applying fluid pressure means irrespective of the control therefor when said door opening control means is operated to door opening position, said relay valve comprising a valve element connected to a fluid pressure responsive element and being formed with a port which is connected to the door control means for conducting fluid pressure to said pressure responsive element, a port which is connected to the brake fluid pressure means, a port connected to the brake control means and a port connected to a source of fluid pressure, said valve element being constructed and arranged to alternately open and close said last-named ports in response to the pressures applied to the fluid pressure responsive element.

3. For use with an automotive vehicle, a combined system including a source of differential fluid pressure, fluid pressure means for applying brakes, fluid pressure means for opening a door, control means for each of said fluid pressure means, said brake control means including a control valve having a pair of normally interconnected ports, one of which is connected to the brake fluid pressure means and the other of which is connected to said source and having a chamber connected to the door control means arranged to receive a change of pressure therefrom when the door control means is moved to open position to disconnect said ports.

4. For use with an automotive vehicle, a door, brakes, a double acting vacuum cylinder for opening and closing the door, a single acting vacuum cylinder for applying the brakes, a brake pedal, a brake control valve operably connected to said pedal, connections from said valve to a source of vacuum and to said brake vacuum cylinder, a relay valve, the connections from said valves to said brake vacuum cylinder passing through a normally open passage in said relay valve, a door control valve, a connection between said door control valve and said source of vacuum, connections from said door control valve to ends of said door vacuum cylinder for alternately admitting vacuum and air to said ends to open and close the door, one of said connections also extending to said relay valve to shift it and admit fluid pressure to the brake cylinder to apply the brake when the door is open.

5. For use with an automotive vehicle, a source of vacuum, a door, brakes, a double acting vacuum cylinder for opening and closing the door, a door control valve, a connection from said door control valve to said source of vacuum, connections from said door control valve to opposite ends of the door cylinder for alternately admitting air and vacuum to said ends to open and close the door, a vacuum cylinder for applying the brakes, a brake control valve formed with three ports one of which is connected to said brake vacuum cylinder, and one of which is connected to said source of vacuum, said brake control valve being constructed and arranged so that said two ports are normally interconnected under the control of one of said connections from the door control valve to said door cylinder.

6. In an automotive vehicle, brakes, a pair of doors, power means for each control means for the brakes, separate control means for each door and means operable when either or both doors are opened by their respective control means to apply the brakes and hold them applied until the said door is closed, said last named means including normally open passage through the brake control valve through which one of said door control means acts to apply the brakes and a relay valve through which the other door control means acts to apply the brakes.

WILLARD B. PAINE.
ALEXANDER A. AGUEEFF.